(12) United States Patent
Marx et al.

(10) Patent No.: US 8,113,097 B2
(45) Date of Patent: Feb. 14, 2012

(54) PROTECTIVE DEVICE

(75) Inventors: Klaus Marx, Stuttgart (DE); Thilo Koeder, Gerlingen (DE); Joachim Platzer, Remseck-Hochberg (DE)

(73) Assignee: Robert Bosch GmbH, Stuttgart (DE)

( * ) Notice: Subject to any disclaimer, the term of this patent is extended or adjusted under 35 U.S.C. 154(b) by 776 days.

(21) Appl. No.: 12/278,175

(22) PCT Filed: Sep. 7, 2007

(86) PCT No.: PCT/EP2007/059389
§ 371 (c)(1),
(2), (4) Date: Aug. 4, 2008

(87) PCT Pub. No.: WO2008/043625
PCT Pub. Date: Apr. 17, 2008

(65) Prior Publication Data
US 2009/0019981 A1    Jan. 22, 2009

(30) Foreign Application Priority Data

Oct. 13, 2006   (DE) .......................... 10 2006 048 560

(51) Int. Cl.
*B26D 7/22* (2006.01)
*B26D 7/00* (2006.01)
*F16D 9/00* (2006.01)

(52) U.S. Cl. ............... 83/58; 83/62; 83/370; 83/DIG. 1; 74/613; 192/129 R; 192/130

(58) Field of Classification Search ................. 83/102.1, 83/477.2, 478, 397.1, DIG. 1, 76.1–76.9, 83/58–68, DIG. 11, 360–372; 74/612–617; 192/129 R–135
See application file for complete search history.

(56) References Cited

U.S. PATENT DOCUMENTS

| | | | | |
|---|---|---|---|---|
| 2,487,396 A * | 11/1949 | Summers | .......................... | 83/471 |
| 2,913,926 A * | 11/1959 | Hammond | ....................... | 74/612 |
| 4,362,196 A * | 12/1982 | Ferdinand et al. | ......... | 144/286.1 |
| 5,630,348 A * | 5/1997 | Kuchler | .......................... | 83/713 |
| 6,959,631 B2 * | 11/2005 | Sako | ............................... | 83/58 |
| 7,373,863 B2 * | 5/2008 | O'Banion et al. | ................ | 83/63 |
| 7,628,101 B1 * | 12/2009 | Knapp et al. | ................... | 83/62.1 |
| 7,975,585 B1 * | 7/2011 | Shiban | .......................... | 83/440.2 |
| 2002/0170399 A1 | 11/2002 | Gass et al. | | |
| 2004/0200329 A1 * | 10/2004 | Sako | ............................... | 83/58 |
| 2004/0226424 A1 * | 11/2004 | O'Banion et al. | .............. | 83/397 |
| 2005/0235793 A1 * | 10/2005 | O'Banion et al. | .............. | 83/478 |
| 2009/0301275 A1 * | 12/2009 | Jung et al. | ......................... | 83/58 |
| 2009/0314148 A1 * | 12/2009 | Gass | ................................ | 83/478 |
| 2010/0037739 A1 * | 2/2010 | Anderson et al. | ................ | 83/58 |
| 2010/0147125 A1 * | 6/2010 | Stellmann | .......................... | 83/74 |
| 2011/0113939 A1 * | 5/2011 | Simon | ............................... | 83/13 |

FOREIGN PATENT DOCUMENTS

| | | | |
|---|---|---|---|
| DE | 23 47 256 | | 1/1975 |
| DE | 94 06 662 | | 7/1994 |
| DE | 197 16 035 | | 10/1998 |
| EP | 1 491 304 | | 12/2004 |
| FR | 2561570 | * | 9/1985 |
| GB | 1 180 458 | | 2/1970 |
| WO | 03/006213 | | 1/2003 |

* cited by examiner

*Primary Examiner* — Laura M. Lee
(74) *Attorney, Agent, or Firm* — Michael J. Striker

(57) ABSTRACT

A protective device for use with table-top circular saws that operate a tool designed as a rotating, disk-shaped sawing tool includes at least one actuator unit and at least one protective unit. The at least one actuator unit moves the protective unit into a protective position on the tool.

12 Claims, 3 Drawing Sheets

Figure 1:
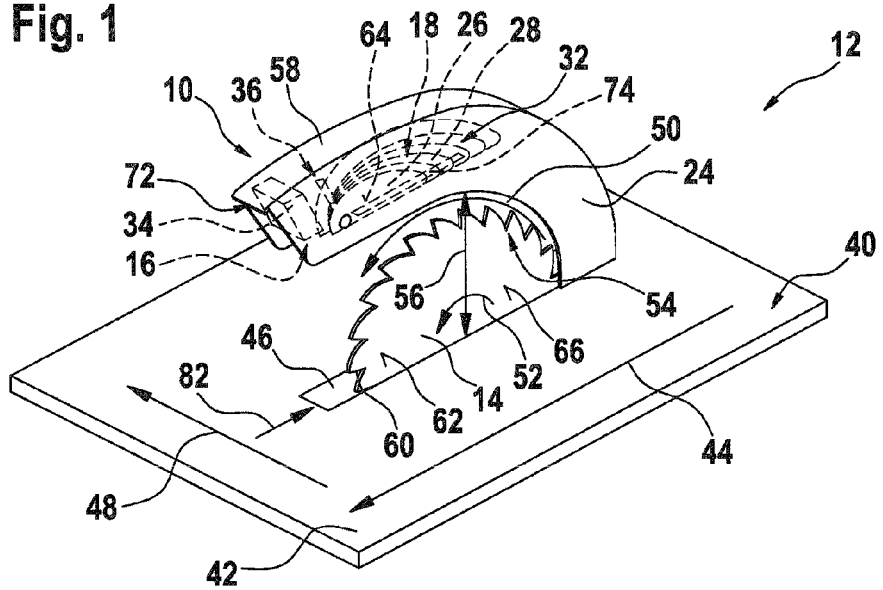

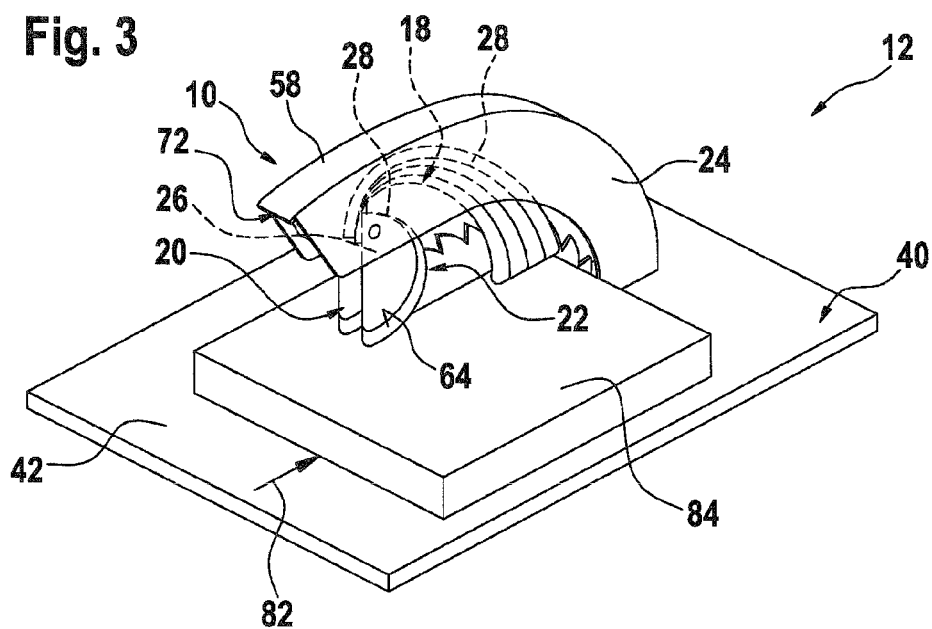
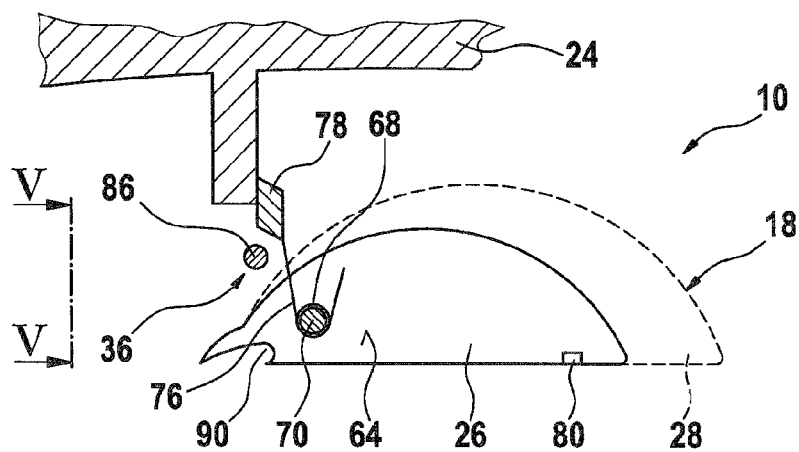

PROTECTIVE DEVICE

RELATED ART

The present invention is directed to a protective device for use with circular saws, for example, table top circular saws.

A protective device is already known that is designed, in particular, for use with table-top circular saws with a rotating, disk-shaped sawing tool, and that includes an actuator unit and a protective unit. The actuator unit is provided—for cases in which an operator is at acute risk of danger—to block the tool or to move it away from the operator using pyrotechnical units.

ADVANTAGES OF THE INVENTION

The present invention is directed to a protective device, in particular for table-top circular saws with a tool designed as a rotating, disk-shaped sawing tool, with at least one actuator unit and at least one protective unit.

It is provided that the actuator unit is provided to move the protective unit into a protective position on the tool, thereby making it possible to provide advantageous protection to an operator of a machine tool, in particular a table-top circular saw, with a protective device. The actuator unit is preferably provided to detect the presence of danger, e.g., imminent contact between the operator and/or another human or animal, and the tool, in particular a sawing tool, and, if the danger is acute, to move the protective unit—at least semi-automatically—into the protective position within a short period of time, which is advantageously a maximum of 15 ms long and is preferably a maximum of 10 ms long. Advantageously, the protective device includes two protective units, one of which provides protection to an operator of a disk-shaped side of the tool that is oriented parallel to a main extension surface of the tool, e.g., on a circular saw blade. In this context, a "protective position" refers, in particular, to a position of the protective unit that protects an operator of the machine tool with a protective device, and/or other humans or animals, against contact with the tool when danger is acute, in particular contact with a sawing tool, and/or that makes contact with the tool nearly impossible.

It is also provided that the power tool includes an upper tool cover, in which the protective unit is located, thereby making it possible to locate the protective unit inside the protective device using a simple design. When in a waiting position, the protective unit is preferably located entirely inside the top tool cover, thereby making it possible to advantageously prevent the protective unit of the protective device from accidentally hindering operation of the machine tool. A "top tool cover" refers, in particular, to a protective unit for a table-top circular saw, which is located at least partially in a circumferential direction around a rotating, disk-shaped tool, in particular a disk-shaped saw blade, and which is fixedly connected with a table of the table-top circular saw. In addition, when the table-top circular saw is in a normal operating position, the top tool cover is also located at least partially above the sawing tool, the top tool cover making it possible for the machine tool to operate without restriction.

The protective unit advantageously includes several adjacently-located protective elements, thereby making it possible to design the protective position of the protective unit in a particularly flexible manner. To this end, a simple configuration of the individual protective elements is also possible, in particular inside the top tool cover.

It is furthermore provided that the actuator unit includes at least one tensioning means, which preload the protective unit in at least one operating position, with the operating position preferably being a waiting position. As a result, an energy, in particular a kinetic energy of the protective unit, may be advantageously stored in the tensioning means, thereby making it possible to quickly replace the protective unit or the individual protective elements of the protective unit from the operating position, which is a waiting position, into the protective position. The tensioning means are preferably formed by an energy accumulator and/or, particularly advantageously, by spring means, and/or by other tensioning means that appear reasonable to one skilled in the technical art.

In a further embodiment of the present invention, it is provided that the actuator unit includes at least one sensor unit, thereby making it possible to detect an acute danger to an operator using the sensor unit, e.g., using a sensor means formed by a camera, and/or other sensor means that appear reasonable to one skilled in the technical art. The sensor unit is preferably provided to trigger a preload of the protective unit if acute danger to an operator or another human or animal arises, thereby enabling the protective unit to be moved out of a first, preloaded operating position and into a further operating position, e.g., a protective position. A "sensor unit" refers, in particular, to a unit that includes sensor means for detecting an acute danger to an operator and, preferably, additional units, such as a control and/or evaluation unit for evaluating the detected data and/or for actuating and/or activating further functions, thereby making it possible to attain an at least partially automatic or—particularly advantageously—a fully automatic triggering of the preload or a holding means for the protective unit via the sensor unit.

It is also provided that the actuator unit includes at least one locking unit, which locks the protective unit in the protective position, thereby making it possible to attain particularly stable and robust protection for an operator and other humans or animals, e.g., if the operator should fall onto the tool, and, in particular, onto the rotating, disk-shaped sawing tool. The locking of the protective unit for an operator is preferably detachable, so that the protective unit or individual protective elements inside the top tool cover may be preloaded once more in an operating position, which is a waiting position, in a reversible manner, without the need to replace any components.

The locking unit is advantageously located inside the top tool cover, thereby making it possible to attain a compact design of the protective device.

The protective elements are preferably designed as lamella, thereby making it possible to prevent the entire protective unit from being blocked by a work piece located in the region of the tool, e.g., the rotating, disk-shaped sawing tool, when the protective elements are extended or folded outwardly. This may be attained, particularly advantageously, when the protective elements are located such that they may be moved independently of each other. The lamellar protective elements are preferably made of a material with high stability, which may advantageously absorb impacts, e.g., a steel alloy, a carbon fiber material, etc.

It is further provided that the power tool includes a bearing unit, which supports the protective elements in at least one direction of motion that moves away from a tool, in particular a rotating, disk-shaped tool, thereby making it possible, advantageously, to push objects away from the tool that move in the direction of the tool, in particular body parts of a human or animal, thereby at least reducing the risk of injury. The motion of the protective elements in the region between a cutting edge of the tool and an operator or an object that is moving in the direction of the tool preferably and advantageously heads away from the cutting edge, thereby advantageously preventing contact between the operator and the sawing tool.

DRAWING

Further advantages result from the description of the drawing, below. An exemplary embodiment of the present invention is shown in the drawing. The drawing, the description, and the claims contain numerous features in combination. One skilled in the art will also advantageously consider the features individually and combine them to form further reasonable combinations.

Figure 2:
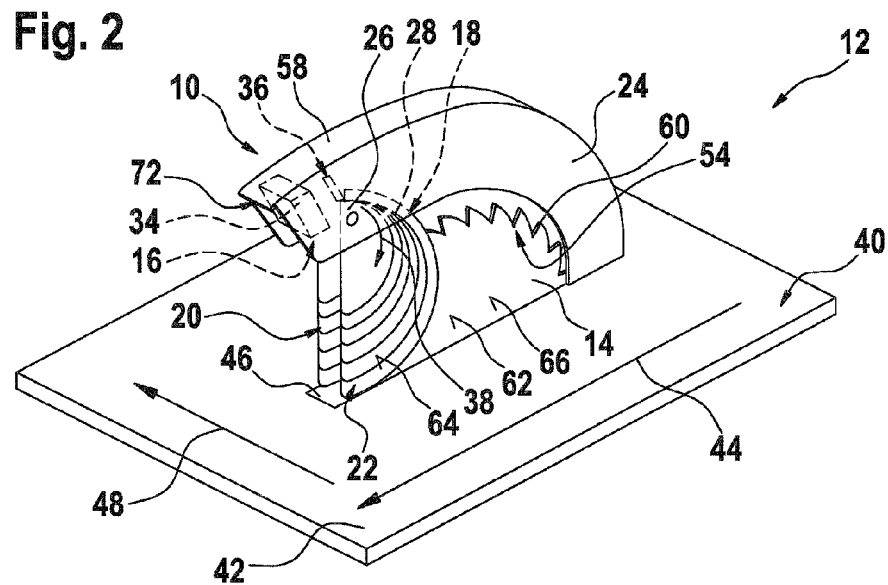
Figure 5:
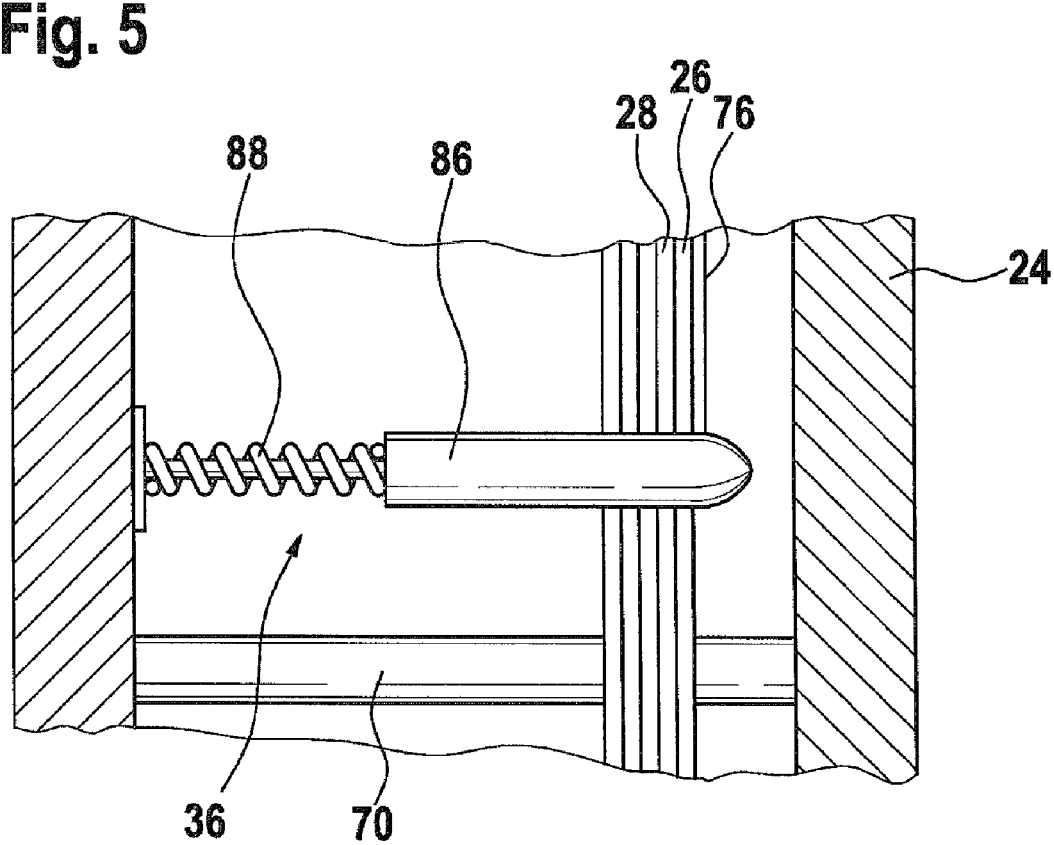

FIG. 1 shows a machine tool designed as a table-top circular saw with an inventive protective device, which includes preloaded protective elements, in a perspective view, FIG. 2 shows the table-top circular saw in FIG. 1 in a perspective view, with the inventive protective device in a protective position, FIG. 3 shows the table-top circular saw in FIG. 1 in a perspective view, with the inventive protective device in a partial protective position, FIG. 4 shows a subregion of the protective device in FIG. 1, and FIG. 5 shows a partial cross section through FIG. 4, along line V-V.

DETAILED DESCRIPTION OF THE EXEMPLARY EMBODIMENT

FIGS. 1 through 3 show a machine tool that is designed as a table-top circular saw 12, and that includes an inventive protective device 10. Table-top circular saw 12 includes protective device 10 and a tool 14 that is designed as a rotating, disk-shaped circular saw blade, and a circular saw bench 40. Circular saw bench 40 includes a table board 42 and not-shown support means, on which table board 42 is mounted. In order to accommodate disk-shaped tool 14, table board 42 includes a longitudinal recess 46, which extends in a main extension direction 44 of table board 42. Recess 46 is also located along a transverse direction 48 of table board 42—which extends perpendicularly to main extension direction 44—in the center of table board 42. Disk-shaped tool 14 is located in recess 46, with a main extension surface 66 of tool 14 being located perpendicularly to table board 42. Tool 14 is attached using a not-shown sawing tool support, which is located below table board 42 when table-top circular saw 12 is located in a normal operating position.

When table-top circular saw 12 is located in a normal operating position, protective device 10 is located partially around tool 14, in a circumferential direction 50, on a top side of table board 42. Protective device 10 includes a protective unit that is designed as top tool cover 24. Top tool cover 24 is fixedly connected with table board 42 and extends from table board 42 outward in rotation direction 52 of tool 14 around a subregion 54 of tool 14. Subregion 54 extends by approximately 90° in a circular pattern around tool 14 or from table board 42 outward, to a region of tool 14 that has a maximum height 56 relative to table board 42. Subregion 54 also transitions into a cover 58, which extends in parallel with table board 42. Top tool cover 24 has the shape of a torus that is open inwardly, in the direction of tool 14, and surrounds cutting edge 60 of tool 14 in a protective manner (FIGS. 1 through 3).

Protective device 10 also includes an actuator unit 16 and two further protective units 18, 20. The two further protective units 18, 20 and actuator unit 16 are located inside cover 58—which extends parallel to table board 42—of toroidal, top tool cover 24. The two further protective units 18, 20 are provided to protect an operator from tool 14 and, to this end, are located parallel to the two lateral surfaces 62 of tool 14. Protective units 18, 20 also include several protective elements 26, 28, which are located next to each other in the manner of lamella (FIGS. 1 through 5). Protective elements 26, 28 have an essentially semicircular, annular segment-type shape, with a main extension surface 64 of protective elements 26, 28 being oriented parallel to main extension surface 66 of disk-shaped tool 14.

Individual protective elements 26, 28 of the two further protective units 18, 20 each include a circular recess 68, in which a bearing unit 70 formed by an axle is located, on which individual protective elements 26, 28 are rotatably supported. Bearing unit 70 is fixedly connected with top tool cover 24, and it is located in a front region 72 of top tool cover 24, which faces a user of table-top circular saw 12, and is perpendicular to main extension surface 66 of disk-shaped tool 14. In a first operating position 32 of protective elements 26, 28, protective elements 26, 28 are attached inside top tool cover 24 via a magnetic holder 74, and they are preloaded by tensioning means of actuator unit 16 (FIGS. 1 and 4). The tensioning means include spring means 76 designed as a leg spring for each of the two further protective units 18, 20. Any other spring means 76 that appear reasonable to one skilled in the technical art and that transfer a torque to protective elements 26, 28, and/or apparently reasonable tensioning means are also feasible in an alternative embodiment of the present invention. Spring means 76 preload protective elements 26, 28 inside front region 72 of top tool cover 24, although only a first protective element 26 of particular protective unit 18, 20 is preloaded. Spring means 76 include, at one end, a segment-type holding element 17, with which spring means 76 bear against top tool cover 24. Spring means 76 are attached at the other end or with a torsion spring with particular protective element 26 (FIG. 4). Further protective elements 28 are held in first operating position 32 by magnetic holder 74. Spring means 76 are located between bearing unit 70 and particular protective element 26 on protective element 26.

Actuator unit 16 also includes a sensor unit 34, which is located in top tool cover 24. Sensor unit 34 includes sensor means, which are designed as a camera, and a control unit. During operation of protective device 10, the camera detects a region of approximately 1 cm to 2 cm around tool 14 of table-top circular saw 12. Using the control unit and the sensor means, imminent contact of the operator with tool 14 is detected. The control unit controls magnetic holder 74, such that, if imminent contact between the operator and tool 14 is detected, magnetic holder 74 of protective elements 26, 28—which are preloaded by the tensioning means or spring means 76—are triggered by the control unit. Via an expanding force of spring means 76, protective elements 26, 28 are moved out of first operating position 32 and into a second operating position, which is a protective position 22.

To provide maximum protection to an operator, and/or to prevent contact between the operator and tool 14, protective elements 26, 28 are moved into protective position 22 within approximately 10 ms after detection has occurred. First protective element 26 is moved via the expanding force of spring means 76, and further protective elements 28 of a protective unit 18, 20 are moved by a driving element 80—which connects individual protective elements 26, 28 with directly adjacent protective elements 26, 28—into protective position 22. Protective elements 26, 28 have a direction of motion 38 that extends parallel to main extension surface 66 of tool 14.

Protective elements 26, 28 are moved around bearing unit 70, with a rotation direction of protective elements 26, 28 around bearing unit 70 being opposite to rotation direction 52 of tool 14. In addition, protective elements 26, 28 have—in the region of cutting edge 60 of tool 14—a direction of motion 38 that is opposite to a feed direction 82 of a work piece 84, so that, e.g., a body part of an operator is pushed away from tool 14 by protective elements 26, 28 (FIGS. 2 and 3).

If a work piece 84 is not located in the sawing region of tool 14, all protective elements 26, 28 are moved into protective position 22 via the triggering of magnetic holder 74 (FIG. 2). To hold protective elements 26, 28 stable in protective position 22 and, therefore, to attain effective protection for an operator, protective elements 26, 28 are locked in protective position 22. As a result, the two protective units 18, 20 each form a lateral shell around tool 14 that extends parallel to main extension surface 66 of tool 14 and prevents the operator from coming in contact with cutting edge 60 of tool 14, since they are located in a region of cutting edge 60 that faces the user. To this end, actuator unit 16 includes a locking unit 36, which is located in front region 72 inside top tool cover 24. Locking unit 36 includes bolt-shaped locking means 86 for each protective unit 18, 20, which are supported via a spring element 88 on top tool cover 24 (FIG. 5). To lock protective elements 26, 28 in position, protective elements 26, 28 include a hook-shaped locking recess 90, which snaps into bolt-shaped locking means 86 when protective elements 26, 28 are in protective position 22.

Bolt-shaped locking means 86 are rotatably supported via spring element 88, so that, when table-top circular saw 12 is locked in position in a switched-off operating state, this state may be released using a not-shown actuating element. Protective elements 26, 28 of individual protective units 18, 20 may then be cocked again in top tool cover 24 using the tensioning means or spring means 76. To this end, an operator folds protective elements 26, 28 around bearing unit 70 and into top tool cover 24. Spring means 76, which bear with retaining element 78 against top tool cover 24, are moved into a preloaded position. Magnetic holder 74 ensures that protective elements 26, 28 are attached in top tool cover 24.

If a work piece 84 to be machined is located in the sawing region of tool 14, individual protective elements 28 are blocked by work piece 84 from moving into protective position 22 (FIG. 3). To this end, individual protective elements 26, 28 are located on bearing unit 70 such that they may be moved independently of each other, and they are detachably connected with each other by driving elements 80, so that, when a protective element 28 or several protective elements 28 are blocked by work piece 84, blocked protective element 28 or blocked protective elements 28 become detached from unblocked protective elements 26, 28. Unblocked protective elements 26, 28 form—in the region of cutting edge 60 around work piece 84—a two-sided shell of tool 14 or cutting edge 60 of work piece 14 that is located parallel to main extension surface 66 of tool 14.

What is claimed is:

1. A protective device for table-top circular saws (12), comprising:
    a tool (14) designed as a rotating, disk-shaped sawing tool,
    at least one actuator unit (16),
    a tool top cover (24);
    at least one protective unit (18, 20) which includes several adjacently-located protective elements (26, 28) and which is located within the top tool cover (24), and
    a bearing unit (70), which supports the protective elements (26, 28) in at least one direction of motion (38) which is directed away from the rotating, disk-shaped tool (14),
    wherein in a waiting position the protective unit (18, 20) is located entirely inside the top tool cover (24), wherein the actuator unit (16) is provided to move the protective unit (18, 20) from the waiting position into a protective position (22) on the tool (14), wherein in the protective position (22) the protective unit (18, 20) forms a lateral shell around the tool (14), which extends parallel to a main extension surface 66 of the tool 14 wherein the protective elements (26, 28) are designed as lamellae and are position to be movable independently of each other.

2. The protective device as recited in claim 1, wherein the actuator unit (16) includes at least one tensioning means, which preloads the protective unit (18, 20) in at least one operating position (32).

3. The protective device as recited in claim 2, wherein the tensioning means is designed as spring means (76).

4. The protective device as recited in claim 1, wherein the actuator unit (16) includes at least one sensor unit (34).

5. The protective device as recited in claim 1, wherein the actuator unit (16) includes at least one locking unit (36), which locks the protective unit (18, 20) in the protective position (22).

6. The protective device as recited in claim 5, wherein the locking unit (36) is located inside the top tool cover (24).

7. The protective device as recited in claim 1, wherein the top tool cover (24) is located at least partially in a circumferential direction around the tool (14) and at least partially above the tool (14).

8. The protective device as recited in claim 1, wherein the protective elements (26, 28) have an essentially semicircular, annular segment-type shape, with a main extension surface (64) of protective elements (26, 28) oriented parallel to a main extension surface (66) of the tool (14).

9. The protective device as recited in claim 1, wherein the bearing unit (70) is fixedly connected to the top tool cover (24) and is located in a front region (72) of the top tool cover (24), which faces a user of the table-top circular saw (12) and is perpendicular to a main extension surface (66) of the tool (14).

10. The protective device as recited in claim 1, further comprising a magnetic holder (74), wherein in the waiting position the protective elements (26, 28) are attached inside the top tool cover (24) via the magnetic holder (74) and are preloaded by tensioning means of the actuator unit (16).

11. The protective device as recited in claim 10, wherein the tensioning means is embodied as a spring means (76) including at one end a segment-type holding element (26) by which the spring means (76) bears against the top tool cover (24) and wherein the spring means (76) is attached at an opposite end with at least one protective element (26, 28).

12. The protective device as recited in claim 1, wherein during a movement from the waiting position to the protective position (22), the protective elements (26, 28) are moved around the bearing unit (70) via the actuator unit (16) along a direction oriented opposite to a rotation direction (52) of the tool (14) and in a region of a cutting edge (60) of the tool (14) along a direction oriented opposite to a feed direction (82) of a work piece (84).

\* \* \* \* \*